(12) United States Patent
Seguchi et al.

(10) Patent No.: US 11,479,055 B2
(45) Date of Patent: Oct. 25, 2022

(54) INK JET RECORDING METHOD AND INK JET RECORDING APPARATUS

(71) Applicant: Seiko Epson Corporation, Tokyo (JP)

(72) Inventors: Kenichi Seguchi, Okaya (JP); Mitsuaki Kosaka, Minowa (JP)

(73) Assignee: SEIKO EPSON CORPORATION

(*) Notice: Subject to any disclaimer, the term of this patent is extended or adjusted under 35 U.S.C. 154(b) by 174 days.

(21) Appl. No.: 17/084,815

(22) Filed: Oct. 30, 2020

(65) Prior Publication Data

US 2021/0129567 A1 May 6, 2021

(30) Foreign Application Priority Data

Oct. 31, 2019 (JP) .............................. JP2019-198480

(51) Int. Cl.
| | |
|---|---|
| *B41M 5/00* | (2006.01) |
| *C09D 11/54* | (2014.01) |
| *C09D 11/322* | (2014.01) |
| *B41J 29/377* | (2006.01) |
| *C09D 11/38* | (2014.01) |
| *B41J 11/00* | (2006.01) |

(52) U.S. Cl.
CPC .......... *B41M 5/0017* (2013.01); *B41J 11/002* (2013.01); *B41J 29/377* (2013.01); *C09D 11/322* (2013.01); *C09D 11/38* (2013.01); *C09D 11/54* (2013.01)

(58) Field of Classification Search
CPC ..... B41M 5/0017; C09D 11/54; B41J 29/377; B41J 11/002
See application file for complete search history.

(56) References Cited

U.S. PATENT DOCUMENTS

| | | | |
|---|---|---|---|
| 5,379,058 A * | 1/1995 | Obu | ....................... B41M 5/363 346/135.1 |
| 2002/0071016 A1* | 6/2002 | Wotton | .................. B41J 11/007 347/102 |

(Continued)

FOREIGN PATENT DOCUMENTS

JP 2015-147405 A 8/2015

*Primary Examiner* — John Zimmermann
(74) *Attorney, Agent, or Firm* — Harness, Dickey & Pierce, P.L.C.

(57) ABSTRACT

An ink jet recording method includes: a treatment liquid adhesion step of adhering a treatment liquid containing an aggregating agent to a recording medium; an ink adhesion step of adhering an aqueous ink composition containing a colorant to the recording medium by ejection thereof from an ink jet head; a first heating step of heating the recording medium to which the treatment liquid and the aqueous ink composition are adhered to a first surface temperature by a first heating mechanism; a second heating step of heating the recording medium after the first heating step to a second surface temperature which is higher than the first surface temperature by a second heating mechanism provided at downstream than the first heating mechanism in a recording medium transport direction; and a cooling step of, after the first heating step and before the second heating step, cooling the recording medium by a cooling mechanism, and by the cooling step, a surface temperature of the recording medium is decreased to a temperature lower than the first surface temperature.

13 Claims, 2 Drawing Sheets

(56) References Cited

U.S. PATENT DOCUMENTS

| | | | |
|---|---|---|---|
| 2009/0244235 A1* | 10/2009 | Houjou | B41M 5/0256 |
| | | | 347/102 |
| 2012/0026264 A1* | 2/2012 | Ikoshi | B41M 7/009 |
| | | | 347/102 |
| 2015/0197654 A1 | 7/2015 | Okuda et al. | |
| 2016/0375680 A1* | 12/2016 | Nishitani | G03G 15/10 |
| | | | 347/102 |
| 2017/0015122 A1* | 1/2017 | Seki | B41J 11/0024 |

* cited by examiner

INK JET RECORDING METHOD AND INK JET RECORDING APPARATUS

The present application is based on, and claims priority from JP Application Serial Number 2019-198480, filed Oct. 31, 2019, the disclosure of which is hereby incorporated by reference herein in its entirety.

BACKGROUND

1. Technical Field

The present disclosure relates to an ink jet recording method and an ink jet recording apparatus.

2. Related Art

Since being capable of recording a highly fine image by a relatively simple apparatus, an ink jet recording method has been rapidly developed in various fields. In particular, various types of investigations on ejection stability and the like have been carried out. For example, JP-A-2015-147405 has disclosed a recording method which includes steps of sequentially adhering a first reaction liquid, a first ink containing a colorant, a second reaction liquid, and a second ink containing a colorant to a non-absorptive recording medium or a low-absorptive recording medium so as to be overlapped with each other. In the recording method described above, the first reaction liquid contains an aggregating agent which aggregates a component of the first ink or which increases the viscosity thereof, and the second reaction liquid contains an aggregating agent which aggregates a component of the second ink or which increases the viscosity thereof.

In an ink jet recording method, when recording is performed using an aqueous ink composition and a treatment liquid containing an aggregating agent, a component of the aqueous ink composition is aggregated, and the aqueous ink composition is rapidly solidified, so that an excellent image quality can be obtained. However, in a recording method using a treatment liquid, a white haze is generated in a recorded matter. In order to suppress the generation of white haze while an excellent image quality is obtained, the ink jet recording method using a treatment liquid containing an aggregating agent is still required to be improved.

SUMMARY

In order to solve the problem described above, the present inventors carried out intensive research. As a result, it was found that by the following ink jet recording method which uses a treatment liquid containing an aggregating agent, while an excellent image quality is obtained, the generation of white haze can be suppressed. The ink jet recording method described above includes a first heating step, a second heating step, and, after the first heating step and before the second heating step, a cooling step of cooling a recording medium by a cooling mechanism, and in the cooling step described above, a surface temperature of the recording medium is decreased to a temperature lower than a surface temperature in the first heating step.

That is, the present disclosure is as described below.

According to an aspect of the present disclosure, there is provided an ink jet recording method comprising: a treatment liquid adhesion step of adhering a treatment liquid containing an aggregating agent to a recording medium; an ink adhesion step of adhering an aqueous ink composition containing a colorant to the recording medium by ejection thereof from an ink jet head; a first heating step of heating the recording medium to which the treatment liquid and the aqueous ink composition are adhered to a first surface temperature by a first heating mechanism; a second heating step of heating the recording medium after the first heating step to a second surface temperature which is higher than the first surface temperature by a second heating mechanism provided at downstream than the first heating mechanism in a recording medium transport direction; and a cooling step of, after the first heating step and before the second heating step, cooling the recording medium by a cooling mechanism, and by the cooling step, a surface temperature of the recording medium is decreased to a temperature lower than the first surface temperature.

According to another aspect of the present disclosure, there is provided an ink jet recording apparatus comprising: a transport mechanism which transports a recording medium; a treatment liquid adhesion portion which adheres a treatment liquid containing an aggregating agent to the recording medium; an ink jet head which adheres an aqueous ink composition containing a colorant to the recording medium by ejection thereof; a first heating mechanism which heats the recording medium to which the treatment liquid and the aqueous ink composition are adhered to a first surface temperature; a second heating mechanism which heats the recording medium heated by the first heating mechanism to a second surface temperature higher than the first surface temperature and which is provided at downstream than the first heating mechanism in a recording medium transport direction; and a cooling mechanism which cools the recording medium at downstream than the first heating mechanism and at upstream than the second heating mechanism in the recording medium transport direction, and the cooling mechanism decreases a surface temperature of the recording medium to a temperature lower than the first surface temperature.

The cooling mechanism may include an air blow mechanism. The air blow mechanism may supply a wind at a wind velocity of 1 m/sec or more. The first surface temperature may be 28° C. to 45° C., and by the cooling step, the surface temperature of the recording medium may be decreased to 20° C. to 34° C. The second surface temperature may be 60° C. or more. A time after the first heating step to a start of the second heating step may be 20 seconds or more. The recording medium may contain a sulfate salt as a material forming a recording surface. A temperature after the cooling step may be lower than the first surface temperature by 3° C. or more. A content of the aggregating agent in the treatment liquid may be 2.0 to 10.0 percent by mass. The aggregating agent may contain a polyvalent metal salt, an organic acid, or a cationic polymer. The treatment liquid may be an aqueous composition and may contain 20.0 percent by mass or more of an organic solvent. The aqueous ink composition may contain 20.0 percent by mass or more of an organic solvent.

DESCRIPTION OF EXEMPLARY EMBODIMENTS

Figure 1:
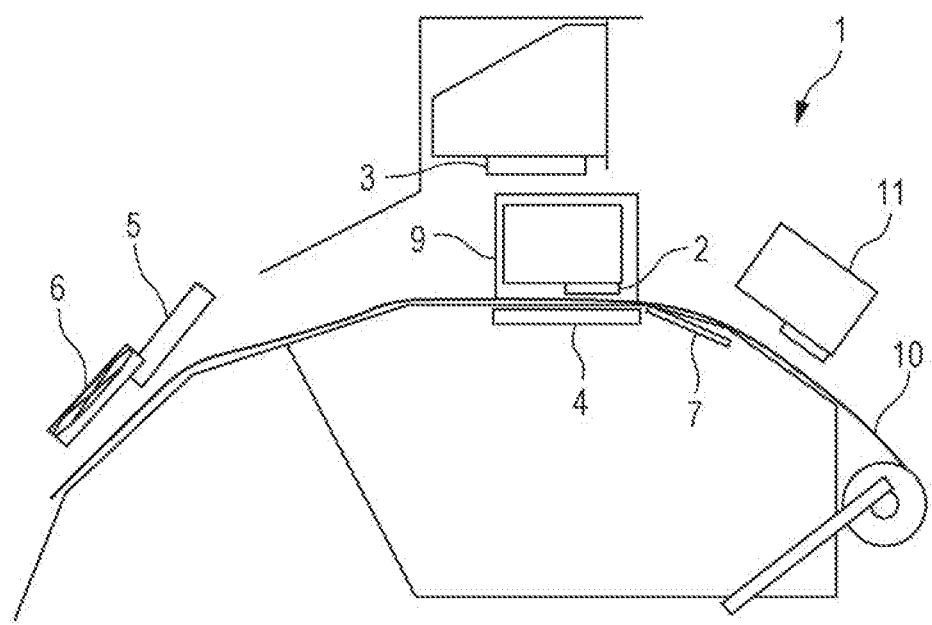
FIG. 1 is a schematic cross-sectional view showing one example of an ink jet recording apparatus 1 according to this embodiment.

Hereinafter, if needed, with reference to the drawings, although an embodiment (hereinafter, referred to as "this embodiment") of the present disclosure will be described in detail, the present disclosure is not limited thereto and may be variously changed and/or modified without departing from the scope of the present disclosure. In addition, in the drawings, elements similar or equivalent to each other are designated by the same reference numeral, and duplicated description will be omitted. In addition, the positional relationship, such as top to bottom and/or right to left, is based on the positional relationship shown in the drawings, unless otherwise particularly noted. Furthermore, the dimensional ratio of the drawing is not limited to the ratio shown in the drawing.

Ink Jet Recording Method

An ink jet recording method according to this embodiment includes a treatment liquid adhesion step of adhering a treatment liquid (hereinafter, referred to as simply "treatment liquid" in some cases) containing an aggregating agent to a recording medium; an ink adhesion step of adhering an aqueous ink composition (hereinafter, referred to as simply "aqueous ink composition" in some cases) containing a colorant to the recording medium by ejection thereof from an ink jet head; a first heating step of heating the recording medium to which the treatment liquid and the aqueous ink composition are adhered to a first surface temperature by a first heating mechanism; a second heating step of heating the recording medium after the first heating step to a second surface temperature which is higher than the first surface temperature by a second heating mechanism provided at downstream (hereinafter, simply referred to as "downstream" in some cases) than the first heating mechanism in a recording medium transport direction; and a cooling step of, after the first heating step and before the second heating step, cooling the recording medium by a cooling mechanism, and by the cooling step, a surface temperature of the recording medium is decreased to a temperature lower than the first surface temperature.

According to the structure described above, an ink jet recording method which is able to obtain an excellent image quality and also to suppress the generation of white haze can be provided. The white haze indicates the state in which a recorded image looks cloudy in white or is viewed as if through a white cloud.

Although the reason the above effect can be obtained by the ink jet recording method according to this embodiment has not been clearly understood, the following may be considered. Through investigation on the reason of the generation of white haze, it was found that when being crystallized and precipitated, the aggregating agent contained in the treatment liquid looks white. Through further investigation in more detail, it was found that when the recording medium is cooled between the first heating step and the second heating step, and subsequently, the second heating step is performed, the generation of white haze can be suppressed. In the past, between the first heating step and the second heating step, the surface temperature is not decreased, and the first heating temperature is maintained, or the rate of decrease in temperature is low after the first heating step. Accordingly, it is believed that since the heat in the first heating step remains as residual heat for a relatively long time, the crystals described above are liable to be produced and grown, the crystal sizes become large, and hence, the white haze is generated. On the other hand, according to this embodiment, it is believed that when the surface temperature of the recording medium is forcedly cooled in the cooling step, the production of the crystals is suppressed, and/or the growth of large crystals is suppressed, so that an abnormality, such as a white haze, may not be observed when a recorded matter is observed by visual inspection.

Furthermore, it is believed that since the heating temperature in the second heating step is set to be higher than the heating temperature in the first heating step, the temperature of the recording medium is rapidly increased as the second heating step is started, and the production and the growth of crystals in the second heating step can be prevented, so that the generation of white haze can be suppressed.

Hereinafter, an ink jet recording apparatus to be used for the ink jet recording method according to this embodiment will be described, and the steps of the ink jet recording method according to this embodiment will be described.

—Ink Jet Recording Apparatus—

The ink jet recording apparatus of this embodiment includes a transport mechanism which transports a recording medium; a treatment liquid adhesion portion which adheres a treatment liquid containing an aggregating agent to the recording medium; an ink jet head which adheres an aqueous ink composition containing a colorant to the recording medium by ejection thereof; a first heating mechanism which heats the recording medium to which the treatment liquid and the aqueous ink composition are adhered to a first surface temperature; a second heating mechanism which heats the recording medium heated by the first heating mechanism to a second surface temperature higher than the first surface temperature and which is provided at downstream than the first heating mechanism in a recording medium transport direction; and a cooling mechanism which cools the recording medium at downstream than the first heating mechanism and at upstream (hereinafter, simply referred to as "upstream" in some cases) than the second heating mechanism in the recording medium transport direction. In addition, the cooling mechanism decreases a surface temperature of the recording medium to a temperature lower than the first surface temperature.

Although the first heating mechanism is not particularly limited, for example, there may be used a platen heater or an infrared heater (hereinafter, also referred to as "IR heater" in some cases) which heats the recording medium simultaneously when the aqueous ink composition is adhered thereto.

Although the second heating mechanism is not particularly limited, for example, a dry heater which heats the recording medium to be transported may be used. For example, there may be used an IR heater, a mechanism which heats the recording medium with a hot wind, or a conductive heating mechanism which heats the recording medium by a member in contact therewith.

Although the cooling mechanism is not particularly limited, for example, there may be used an air blow mechanism or a mechanism which performs cooling using a cooling tube, a Peltier element, or the like. Among those mechanisms mentioned above, as the cooling mechanism, an air blow mechanism is preferable.

Hereinafter, an ink jet recording apparatus 1 in which a platen heater and an IR heater are used as the first heating mechanism, a dry heater is used as the second heating mechanism, and an air blow mechanism is used as the cooling mechanism will be described in more detail by way of example.

FIG. 1 is a schematic cross-sectional view of one example of the ink jet recording apparatus 1 according to this embodiment. The ink jet recording apparatus 1 includes an ink jet head 2 for aqueous ink compositions, an IR heater 3, a platen heater 4, a dry heater 5, a cooling fan 6, a pre-heater 7, and a treatment liquid ink jet head 11. In the schematic cross-sectional view of FIG. 1, during recording, a recording medium 10 is transported from the right to the left in the drawing.

The treatment liquid ink jet head 11 is a head to eject a treatment liquid to the recording medium 10. As the ink jet head 11, a related known method may be used, and for example, there may be mentioned a head which ejects liquid droplets using vibration of a piezoelectric element, that is, a head forming liquid droplets by mechanical deformation of the piezoelectric element.

The ink jet head 2 is a head to eject an aqueous ink composition to the recording medium 10. As the ink jet head 2, a related known method may be used, and for example, there may be mentioned a head which ejects liquid droplets using vibration of a piezoelectric element, that is, a head forming liquid droplets by mechanical deformation of the piezoelectric element.

The IR heater 3 and the platen heater 4 mainly heat the recording medium 10 and perform the first heating step so as to increase a surface temperature of the recording medium 10 to the first surface temperature. By the IR heater 3, the recording medium 10 can be heated from an ink jet head 2 side. In addition, when the platen heater 4 is used, the recording medium 10 can be heated from a side opposite to the ink jet head 2 side. In addition, the IR heater 3 and the platen heater 4 can also heat the ink jet head 2. One of the IR heater 3 and the platen heater 4 may only be used.

The dry heater 5 is a heater to dry the recording medium 10 to which the treatment liquid and the aqueous ink composition are adhered so as to perform the second heating step. Since the recording medium 10 to which the treatment liquid and the aqueous ink composition are adhered is heated, for example, moisture contained in the treatment liquid and the aqueous ink composition can be more rapidly evaporated and dried.

The ink jet recording apparatus 1 includes the cooling fan 6 to cool the recording medium 10 at downstream than the dry heater 5. After the recording medium 10 is dried, since the surface of the recording medium is cooled by the cooling fan 6, the recording medium after the second heating step can be rapidly cooled and easily handled.

The ink jet recording apparatus 1 includes the pre-heater 7 which pre-heats the recording medium 10 before the aqueous ink composition is ejected to the recording medium 10. Since the recording medium 10 is pre-heated before the aqueous ink composition is ejected, on the recording medium 10, a high quality image having less blurring tends to be formed. In particular, as the recording medium 10, when a non-absorptive or a low-absorptive recording medium is used, a high quality image tends to be formed.

The ink jet head 2 is mounted on a carriage 9. While the carriage 9 performs a scanning (main scanning) in a front-to-rear direction to the plane of the drawing, the aqueous ink composition is ejected from the head and adhered to the recording medium facing the head. Since the scanning and transportation (sub-scanning) of the recording medium 10 are alternately performed, recording is performed. That is, this recording method is a multi-pass recording method in which recording is performed by a plurality of scanning operations. This method is also called a serial recording method. In addition, the structure may also be formed such that at the position of the ink jet head 2, a head which ejects the aqueous ink composition and a head which ejects the treatment liquid are mounted on the carriage 9 so as to be sequentially disposed. In the case described above, the heads may be disposed in the recording medium transport direction or in a scanning direction. In the case described above, at the position of the ink jet head 11, the head is not required.

Figure 2:
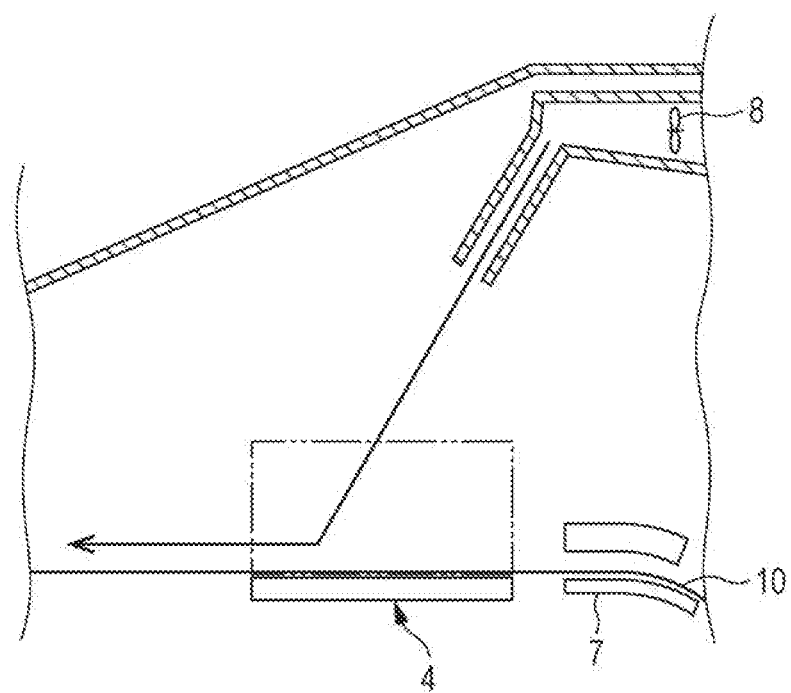
FIG. 2 is a cross-sectional view showing a schematic structure of one example of an air blow mechanism of an ink jet recording apparatus according to this embodiment.

The ink jet recording apparatus 1 includes, as the air blow mechanism, air blow fans 8 provided at downstream than the platen heater 4 and at upstream than the dry heater 5 so as to cool the recording medium 10. The air blow fans 8 are not shown in FIG. 1. FIG. 2 is a cross-sectional view showing a schematic structure of one example of the air blow mechanism of the ink jet recording apparatus according to this embodiment. In FIG. 2, the ink jet head 2 is mounted on the carriage 9, and while the carriage 9 is transferred in the main scanning direction, that is, in the front-to-rear direction to the plane of the drawing, the main scanning is performed such that the aqueous ink composition is ejected from the ink jet head 2.

The fans 8 are sequentially provided in a width direction (main scanning direction) of the recording medium 10, that is, in the front-to-rear direction to the plane of the drawing, so as to always supply a wind having a belt shape from one end to the other end of the width of the recording medium 10. As shown in FIG. 2, the wind supplied from the fans 8 comes in contact with the surface of the recording medium 10 and reaches a downstream than the platen heater 4 and an upstream than the dry heater 5 after changing its direction along the recording medium in the recording medium transport direction. Since the angle formed between the wind supplied from the fans 8 and the recording medium 10 at a right side of the drawing is an acute angle, after coming in contact with the recording medium 10, the wind flows downstream in the transport direction of the recording medium 10. Accordingly, since the recording medium 10 can be cooled at downstream than the first heating mechanism, the crystal growth of the aggregating agent is suppressed, and as a result, the generation of white haze can be prevented.

The air blow may be performed on the recording medium at least at a position downstream than the platen heater 4 and upstream than the dry heater 5 so as to decrease the temperature of the recording medium at the position described above. In the example shown in FIG. 2, the air blow is also performed on the recording medium at the position of the platen heater 4. Accordingly, since a solvent component vapor of ink generated in the first heating step is removed above the recording medium, the drying by the first heating step is promoted, and the first heating step can be preferably performed by the minimum heating. In addition, by the air blow, since the heating in the first heating step is suppressed, the crystal growth of the aggregating agent is suppressed, and the generation of white haze is preferably further suppressed.

By adjusting the intensity of the wind, at a position between the platen heater 4 and the dry heater 5 in the recording medium transport direction, the air blow may be sufficiently performed on the recording medium. In addition, in order not to disturb the heating by the dry heater 5 due to an excessive influence of the air blow thereon, the intensity of the air blow is preferably adjusted.

When a direction orthogonal to a recording surface of the recording medium from the upper side thereof is regarded as 0°, the angle of the air blow may be set to an angle of 0° to 90° with respect to a recording medium transport direction side. Even when the angle is set to 0°, the wind which perpendicularly comes in contact with the recording surface may partially flows downstream in the recording medium transport direction, and as a result, the recording medium can be cooled at downstream than the platen heater 4 in the transport direction. The angle is more preferably more than 0° to 90°.

A wind temperature is preferably ordinary temperature or less and, for example, is preferably 25° C. or less. In addition, by providing a cooling tube, a Peltier element, or the like for the air blow mechanism, a wind which is cooled lower than ordinary temperature may be generated and supplied. Since the mechanism can be simplified, the air blow is preferably performed without decreasing the temperature with a cooling device, such as a cooling tube or a Peltier element. For example, the air blow is preferably performed at ordinary temperature.

When the air blow is not performed on the recording medium at the position of the platen heater 4, the air blow may be performed at a position between the platen heater 4 and the dry heater 5 in the recording medium transport direction.

Figure 3:
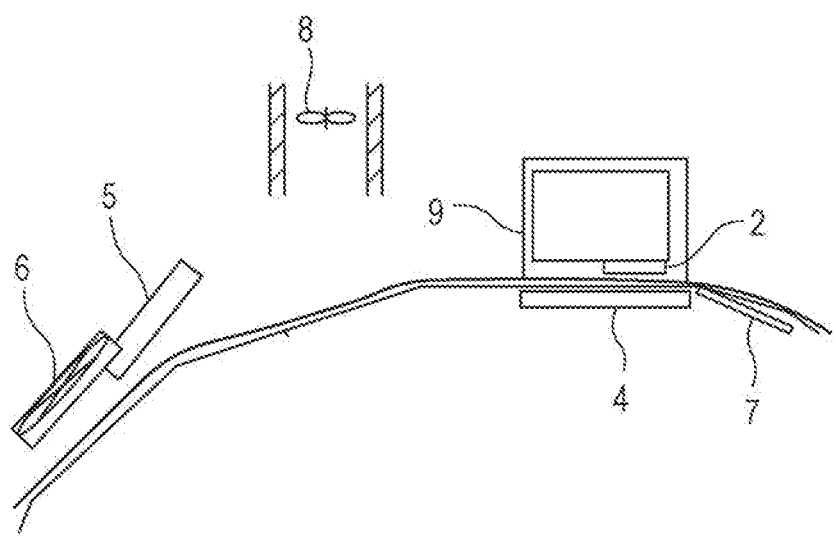
FIG. 3 is a cross-sectional view showing a schematic structure of another example of the air blow mechanism of the ink jet recording apparatus according to this embodiment.

FIG. 3 is a cross-sectional view showing a schematic structure of another example of the air blow mechanism of the ink jet recording apparatus according to this embodiment. The example shown in FIG. 3 is an example in which the fans 8 are provided between the platen heater 4 and the dry heater 5 disposed in the recording medium transport direction. The constituent elements shown in FIG. 3 are the same as those shown in FIG. 1. In the example shown in FIG. 3, the fans 8 also decrease the temperature of the recording medium by air blow performed thereon at a position between the platen heater 4 and the dry heater 5 disposed in the recording medium transport direction. In addition, in the case of the example shown in FIG. 3, since the fans 8 are disposed at a position relatively close to the dry heater 5, the air blow by the fans 8 may come in contact with the recording surface of the recording medium and generate an unintentional wind in the recording medium transport direction, and when the wind thus generated reaches the second heating mechanism, the temperature in the second heating step may be unfavorably decreased in some cases. In order to prevent this unfavorable incident, as shown in the example shown in FIG. 2, the fans 8 are preferably provided at a position not between the platen heater 4 and the dry heater 5. That is, the above example shown in FIG. 2 is an example in which the fans 8 are provided at upstream in the recording medium transport direction than the position between the platen heater 4 and the dry heater 5.

When the distance between the platen heater 4 and the dry heater 5 is short in the recording medium transport direction, and the position at which the cooling mechanism is installed cannot be sufficiently secured, the fans 8 are preferably provided at the position other than that between the platen heater 4 and the dry heater 5.

In addition, the fans 8 in FIG. 2 show one mode of the air blow mechanism which supplies a wind to the recording medium 10, and any air blow mechanism may be used as long as capable of supplying a wind to the recording medium 10.

In addition, as the cooling mechanism, a mechanism other than the air blow mechanism may also be used. For example, there may be used a cooling mechanism in which, at a position between the platen heater 4 and the dry heater 5 disposed in the recording medium transport direction, the recording medium is cooled from a lower side thereof using a cooling tube, a Peltier element, or the like through a transport path in contact with a bottom surface of the recording medium.

In addition, although the ink jet recording apparatus described above is an apparatus which performs a multi-pass recording method, a one-pass recording method may also be performed such that recording is performed by one scanning using a line head having a length larger than a recording width of the recording medium in a width direction. The air blow mechanism in this case may supply a wind from upstream or downstream in the recording medium transport direction to the recording medium at a position between the first heating mechanism and the second heating mechanism disposed in the recording medium transport direction. In addition, a wind may also be supplied in a direction intersecting the recording medium transport direction to the recording medium at a position between the first heating mechanism and the second heating mechanism disposed in the recording medium transport direction. For example, a wind may also be supplied in the front-to-rear direction to the plane of the drawing.

Hereinafter, various materials used in the ink jet recording method of this embodiment will be described in detail.

—Treatment Liquid—

The treatment liquid contains the aggregating agent. Since the treatment liquid contains the aggregating agent, although heating is not performed, the pigment contained in the aqueous ink composition can be aggregated, and aggregation irregularities of the aqueous ink composition can be prevented, so that a recorded matter excellent in image quality can be obtained.

——Aggregating Agent——

Although the aggregating agent is not particularly limited, for example, a polyvalent metal salt, an organic acid, or a cationic polymer may be mentioned. Among those mentioned above, a polyvalent metal salt is preferable. When the aggregating agent is a polyvalent metal salt, the generation of white haze can be more significantly suppressed.

———POLYVALENT METAL SALT———

Although the polyvalent metal salt is not particularly limited, for example, a polyvalent metal salt of an acid may be mentioned.

Although the polyvalent metal salt is not particularly limited, for example, there may be mentioned a salt of an alkali earth metal, such as magnesium or calcium, of Group 2 in the periodic table; a transition metal, such as titanium or zirconium, of Group 3 in the periodic table; an earth metal, such as aluminum, of Group 13 in the periodic table; or a lanthanoid, such as lanthanum or neodymium. Among those salts mentioned above, the salt of the metal of Group 2 in the periodic table is preferable, a calcium salt or a magnesium salt is more preferable, and a calcium salt is further preferable.

Although the acid forming a salt with a polyvalent metal is not particularly limited, for example, there may be mentioned carboxylic acid, sulfuric acid, nitric acid, hydrogen chloride, or hydrogen thiocyanate. Although the carboxylic acid is not particularly limited, for example, there may be mentioned formic acid, acetic acid, propionic acid, or benzoic acid. Among those mentioned above, a carboxylic acid or nitric acid is preferable, acetic acid, propionic acid, or nitric acid is more preferable, and propionic acid or nitric acid is further preferable.

Among those polyvalent salts, for example, there may be mentioned a calcium salt or a magnesium salt of a carboxylic acid; a calcium salt or a magnesium salt of sulfuric acid; a calcium salt or a magnesium salt of nitric acid; calcium chloride or magnesium chloride; or a calcium salt or a magnesium salt of hydrogen thiocyanate. The polyvalent metal and the organic acid or the inorganic acid, which collectively form a polyvalent metal salt, may be used in an arbitrary combination and may also form a hydrate. In addition, the polyvalent metal salts may be used alone, or at least two types thereof may be used in combination.

——Organic Acid——

Although the organic acid is not particularly limited, for example, there may be mentioned oxalic acid, malonic acid, succinic acid, citric acid, or acetic acid. Among those organic acids, a monovalent or a divalent carboxylic acid is preferable. In addition, the organic acids may be used alone, or at least two types thereof may be used in combination.

In addition, the organic acid may be in the form of salt. Although the organic acid salt is not particularly limited, for example, a monovalent metal salt of the above organic acid may be mentioned. As the metal salt, for example, there may be mentioned an alkali metal salt, such as a sodium salt or a potassium salt, of Group 1 of the periodic table. Although the salt of the organic acid is not particularly limited, for example, sodium acetate may be mentioned. In addition, the organic acid salts may be used alone, or at least two types thereof may be used in combination. However, an organic acid salt also functioning as a polyvalent metal salt is categorized as a polyvalent metal salt.

——Polymer——

Although the polymer is not particularly limited, for example, a cationic polymer may be mentioned. Although the cationic polymer is not particularly limited, for example, an amine polymer may be mentioned. The amine polymer may be a resin having an amino group in its structure. As the amine polymer, an amine polymer, such as an amine/epichlorohydrin condensed polymer, a polyallylamine, or a polyallylamine derivative, may be mentioned. As the cationic polymer, a resin dissolvable in the treatment liquid or a resin dispersible in the treatment liquid in a resin emulsion state or the like is preferable, and the former is more preferable.

The content of the aggregating agent in the treatment liquid with respect to the total mass of the treatment liquid is preferably 0.1 to 30.0 percent by mass. The content of the aggregating agent is more preferably 1.0 percent by mass or more, further preferably 3.0 percent by mass or more, and even further preferably 5.0 percent by mass or more. Since the content of the aggregating agent is the lower limit or more, the image quality of a recorded matter to be obtained can be further improved. The content of the aggregating agent is more preferably 20.0 percent by mass or less, further preferably 10.0 percent by mass or less, and even further preferably 7.0 percent by mass or less. Since the content of the aggregating agent is the upper limit or less, the generation of white haze in the recorded matter to be obtained can be significantly suppressed.

——Surfactant——

The treatment liquid may contain a surfactant. Although the surfactant contained in the treatment liquid is not particularly limited, for example, there may be mentioned a nonionic surfactant, an anionic surfactant, or a cationic surfactant. Among those mentioned above, a nonionic surfactant is preferable.

The content of the surfactant in the treatment liquid with respect to the total mass of the treatment liquid is preferably 0.1 to 3.0 percent by mass, more preferably 0.2 to 2.0 percent by mass, and further preferably 0.3 to 1.5 percent by mass. Since the content of the surfactant is in the range described above, the wettability of the treatment liquid tends to be further improved.

——Defoaming Agent——

The treatment liquid may contain a defoaming agent. Although the defoaming agent is not particularly limited, for example, there may be mentioned a silicone defoaming agent, a polyether defoaming agent, a fatty acid ester defoaming agent, or an acetylene glycol defoaming agent. As a commercially available product of the defoaming agent, for example, BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, or BYK-1770 (product name, manufactured by BYK Japan KK); Surfynol DF37, DF110D, DF58, DF75, DF220, MD-20, or EnviroGem AD01 (product name, manufactured by Nisshin Chemical Industry Co., Ltd.). The defoaming agents may be used alone, or at least two types thereof may be used in combination.

The content of the defoaming agent in the treatment liquid with respect to the total mass of the treatment liquid is preferably 0.03 to 0.7 percent by mass, more preferably 0.05 to 0.5 percent by mass, and further preferably 0.08 to 0.3 percent by mass.

——Water——

The treatment liquid preferably contains water and is preferably an aqueous composition. The aqueous composition indicates a composition containing 30.0 percent by mass or more of water in the treatment liquid. As the water, for example, there may be mentioned purified water, such as ion-exchanged water, ultrafiltration water, reverse osmosis water, or distilled water, or water, such as ultrapure water, from which ionic impurities are removed as much as possible. In addition, when water sterilized by ultraviolet radiation or addition of hydrogen peroxide is used, generation of fungi and/or bacteria can be prevented when the treatment liquid is stored for a long time. As a result, the storage stability tends to be further improved.

The content of the water in the treatment liquid with respect to the total mass of the treatment liquid is preferably 55.0 to 99.0 percent by mass, more preferably 60.0 to 90.0 percent by mass, and further preferably 65.0 to 80.0 percent by mass.

——Organic Solvent——

The treatment liquid preferably contains an organic solvent. Although the organic solvent is not particularly limited, for example, there may be mentioned an alcohol, a glycol, or a nitrogen-containing organic solvent. Although the alcohol and the glycol are not particularly limited, for example, there may be mentioned glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-isopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, isopropyl alcohol, n-butanol, 2-butanol, tert-butanol, isobutanol, n-pentanol, 2-pentanol, 3-pentanol, or tert-pentanol. Although the nitrogen-containing organic solvent is not particularly limited, for example, there may be mentioned N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, or 1,1,3,3-tetramethyl urea. Among those mentioned above, 1,2-hexanediol, triethylene glycol monobutyl ether, or dipropylene glycol monopropyl ether is preferable. In addition, as the organic solvent, a volatile water-soluble organic solvent is more preferable. The organic solvents may be used alone, or at least two types thereof may be used in combination.

The content of the organic solvent in the treatment liquid with respect to the total mass of the treatment liquid is preferably 1.0 to 50.0 percent by mass, more preferably 10.0 to 40.0 percent by mass, and further preferably 20.0 to 35.0 percent by mass. Since the content of the organic solvent is in the range described above, the generation of white haze can be more significantly suppressed. In particular, since the treatment liquid is an aqueous composition, and the content of the organic solvent is 20.0 percent by mass or more, the generation of white haze can be more significantly suppressed.

—Aqueous Ink Composition—

In the ink jet recording method of this embodiment, an aqueous ink composition is used. The aqueous ink composition indicates a composition in which 30.0 percent by mass or more of water is contained in the ink composition. The aqueous ink composition contains a colorant. In addition, the aqueous ink composition may also contain resin particles and/or a surfactant.

———Colorant———

The colorant used in the aqueous ink composition will be described below. In addition, as the colorant, a dye and a pigment may be mentioned, and among those mentioned above, a pigment is preferable.

Although carbon black may be mentioned as a black colorant used for a black ink, the black colorant is not particularly limited, and for example, there may be mentioned No. 2300, No. 900, MCF88, No. 33, No. 40, No. 45, No. 52, MA7, MA8, MA100, or No. 2200B (product name, manufactured by Mitsubishi Chemical Corp.); Raven 5750, Raven 5250, Raven 5000, Raven 3500, Raven 1255, or Raven 700 (product name, manufactured by Columbia Carbon); Regal 400R, Regal 330R, Regal 660R, Mogul L, Monarch 700, Monarch 800, Monarch 880, Monarch 900, Monarch 1000, Monarch 1100, Monarch 1300, or Monarch 1400 (product name, manufactured by Cabot Corporation); or Color Black FW1, Color Black FW2, Color Black FW2V, Color Black FW18, Color Black FW200, Color Black S150, Color Black 5160, Color Black 5170, Printex 35, Printex U, Printex V, Printex 140U, Special Black 6, Special Black 5, Special Black 4A, or Special Black 4 (product name, manufactured by Degussa).

As the white colorant to be used for a white ink, a white dye or a white pigment may be mentioned, and of the colorants described above, a white pigment is preferable. Although the white colorant is not particularly limited, for example, there may be mentioned an alkaline earth metal sulfate, such as barium sulfate, an alkaline earth metal carbonate, such as calcium carbonate, a silica, such as a fine silicic acid powder or a synthetic silicate, a metal compound, such as calcium silicate, alumina, alumina hydrate, titanium dioxide, or zinc oxide, talc, or clay. Among those mentioned above, titanium dioxide is preferable. As the white colorant, in more particular, C.I. Pigment White 6, 18, or 21 may be mentioned.

Although a yellow colorant used for a yellow ink as a color ink is not particularly limited, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

Although a magenta colorant used for a magenta ink as a color ink is not particularly limited, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

Although a cyan colorant used for a cyan ink as a color ink is not particularly limited, for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

Although a color colorant other than the magenta, cyan, and yellow is not particularly limited, for example, there may be mentioned C.I. Pigment Green 7 or 10, C.I. Pigment Brown 3, 5, 25, or 26, C.I. Pigment Orange 1, 2, 5, 7, 13, 14, 15, 16, 24, 34, 36, 38, 40, 43, or 63.

When the pigment is used as the colorant described above, the pigment is preferably added to the aqueous ink composition as a pigment dispersion liquid obtained by dispersing a pigment in water with a dispersant; as a pigment dispersion liquid obtained by dispersing self-dispersive surface-treated pigment particles in water, the pigment particles having surfaces on which hydrophilic groups are introduced using a chemical reaction; or as a pigment dispersion liquid obtained by dispersing a pigment covered with a polymer in water.

Although the dispersant is not particularly limited, for example, there may be mentioned a polymer dispersant or a surfactant. Although the polymer dispersant is not particularly limited, for example, there may be mentioned a protein, such as a glue, a gelatin, a casein, or an albumin; a natural rubber, such as an arabic gum or a tragacanth gum; a glucoside such as a saponin; an alginic acid propylene glycol ester, a triethanolamine alginate, or a fermented product of an ammonium alginate; a cellulose derivative, such as a methylcellulose, a carboxymethyl cellulose, or a hydroxyethyl cellulose; a poly(vinyl alcohol); a poly(vinyl pyrrolidone); an acrylic resin, such as a poly(acrylic acid), an acrylic acid-acrylonitrile copolymer, a potassium acrylate-acrylonitrile copolymer, a vinyl acetate-acrylate copolymer, or an acrylic acid-acrylate copolymer; a styrene-acrylic acid resin, such as a styrene-acrylic acid copolymer, a styrene-methacrylic acid copolymer, a styrene-methacrylic acid-acrylate copolymer, or a styrene-m-methylstyrene-acrylic acid copolymer; a styrene-maleic acid copolymer, a styrene-maleic anhydride copolymer, or a vinyl naphthalene-acrylic acid copolymer; a vinyl acetate copolymer, such as a vinyl acetate-ethylene copolymer, a vinyl acetate-fatty acid vinyl ethylene copolymer, a vinyl acetate-maleate copolymer, a vinyl acetate-croton copolymer, or a vinyl acetate-acrylic acid copolymer; or a salt of each of those mentioned above. Although the surfactant is not particularly limited, for example, there may be mentioned an anionic surfactant, a nonionic surfactant, or an amphoteric surfactant.

The self-dispersive surface-treated pigment on which hydrophilic groups are introduced described above is a pigment configured to be dispersed or dissolved in water without using a dispersant by a surface treatment which directly bonds a carboxy group or its salt to the surface of the pigment. In more particular, by a physical treatment of vacuum plasma or a chemical treatment using an oxidant, such as sodium hypochlorite or ozone, a functional group or a molecule having a functional group is grafted on the surface of the pigment, so that the pigment described above can be obtained. The number of functional groups to be grafted on one pigment particle may be either one or at least two. The type of functional group to be grafted and the degree of grafting may be appropriately determined in consideration of the dispersion stability in the aqueous ink composition, color density, and drying property at a front surface of the ink jet head.

Although the pigment covered with a polymer described above is not particularly limited, for example, the pigment may be obtained such that after a pigment is dispersed using a dispersant having a polymerizable group, emulsion polymerization is performed in water using a monomer (copolymerizable monomer) copolymerizable with the dispersant and a photoradical polymerization initiator. Among the polymers described above, a polymer obtained from a monomer or an oligomer having, as a double bond, at least one of an acryloyl group, a methacryloyl group, a vinyl group, and an allyl group by a known polymerization method using a photoradical polymerization initiator may be preferably used. The emulsion polymerization may be performed using a general method and may be advanced by free radicals generated by thermal decomposition of a water-soluble photoradical polymerization initiator under the presence of an emulsifier.

The pigments and the dispersants forming the above pigment dispersion liquid may be respectively used alone, or at least two types thereof may be used in combination.

———Resin Particles———

The resin particles according to this embodiment contain a resin. Since the resin particles are used, as the aqueous ink composition is dried, the resin particles and other components, such as a colorant, are fused to each other and fixed to the recording medium, and hence, the abrasion resistance of an image of the recorded matter can be further improved. Although the resin of the resin particles are not particularly limited, for example, there may be mentioned an acrylic resin, an urethane resin, an olefinic resin, a vinyl chloride resin, a vinyl alcohol resin, a vinyl ether resin, a vinyl pyrrolidone resin, a vinyl pyridine resin, a vinyl carbazole resin, a vinyl imidazole resin, a vinylidene chloride resin, or a fluorine resin. Among those resins mentioned above, an acrylic resin or an urethane resin is preferable, and an acrylic resin is more preferable. In addition, the acrylic resin is a resin obtained by polymerization at least using an acrylic monomer, includes a copolymer of an acrylic monomer and another monomer, such as a vinyl monomer, and for example, also includes an acryl-styrene resin.

The resin particles according to this embodiment are preferably resin particles of a resin emulsion. The resin emulsions may be used alone, or at least two types thereof may be used in combination. As the resin emulsion, an emulsion obtained from known materials by a known production method may be used, or a commercially available product may also be used. Although the commercially available product of the resin emulsion is not particularly limited, for example, there may be mentioned Movinyl 966A (product name, manufactured by The Nippon Synthetic Chemical Industry Co., Ltd., acrylic resin emulsion); Microgel E-1002 or Microgel E-5002 (product name, manufactured by Nippon Paint Co., Ltd.); Boncoat 4001 or Boncoat 5454 (product name, manufactured by DIC Corporation); SAE1014 (trade name, Zeon Corporation); Saivinol SK-200 (product name, manufactured by Saiden Chemical Industry Co., Ltd.); Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, or Joncryl 7610 (product name, manufactured by BASF); or NK Binder-R-5HN (product name, manufactured by Shin-Nakamura Chemical Co., Ltd., acrylic emulsion, solid content: 44%).

The glass transition temperature of the resin of the resin particles is preferably −30° C. or more, and in order to improve a cracking resistance, the glass transition temperature thereof is more preferably 20° C. or more and further preferably 40° C. or more. In addition, in order to further improve the abrasion resistance, the glass transition temperature described above is further preferably 50° C. or more and even further preferably 60° C. or more. The glass transition temperature described above is preferably 120° C. or less, and in order to further improve the abrasion resistance of the recorded matter, the glass transition temperature described above is more preferably less than 90° C. and further preferably 80° C. or less.

The glass transition temperatures of the resin of the resin particles can be measured by a differential scanning calorimeter (DSC) in accordance with JIS K7121: 1987. As a commercial product of the differential scanning calorimeter (DSC), for example, "DSC6220" (product name, manufactured by Seiko Denshi Kogyo Co., Ltd.) may be mentioned.

The volume average particle diameter of the resin particles is preferably 10 to 300 nm, more preferably 30 to 250 nm, and further preferably 80 to 230 nm. In the case described above, for example, the abrasion resistance and the ejection stability are preferably more excellent. The volume average particle diameter is regarded as a value represented by $D_{50}$ measured by a dynamic light scattering method.

The content of the resin particles with respect to the total mass of the aqueous ink composition is preferably 1.0 to 15.0 percent by mass, more preferably 2.0 to 10.0 percent by mass, and further preferably 3.0 to 8.0 percent by mass. The content described above indicates the content of the resin particles in one type of ink composition. Since the content is in the range described above, the abrasion resistance of the recorded matter can be further improved.

———Surfactant———

The aqueous ink composition used in the ink jet recording method of this embodiment preferably contains a surfactant. Although the surfactant is not particularly limited, for example, an acetylene glycol surfactant, a fluorine surfactant, or a silicone surfactant may be mentioned. Among those mentioned above, since the solubility in the treatment liquid is increased, and foreign materials are further not likely to be generated in the treatment liquid, a silicone surfactant is more preferable.

Although the acetylene glycol surfactant is not particularly limited, for example, there may be mentioned 2,4,7,9-tetramethyl-5-decyne-4,7-diol or an alkylene oxide adduct thereof, or 2,4-dimethyl-5-decyne-4-ol or an alkylene oxide adduct thereof. Although a commercially available product of the acetylene glycol surfactant is not particularly limited, for example, there may be mentioned Olfine 104 Series or E series, such as Olfine E1010 (trade name, manufactured by Air Products and Chemicals, Inc.) or Surfynol 465 or Surfynol 61 (trade name, manufactured by Nisshin Chemical Industry Co., Ltd.). The acetylene glycol surfactants may be used alone, or at least two types thereof may be used in combination.

Although the fluorine surfactant is not particularly limited, for example, there may be mentioned a perfluoroalkylsulfonate salt, a perfluoroalkylcarbonate salt, a perfluoroalkylphosphorus salt, a perfluoroalkyl ethylene oxide adduct, a perfluoroalkyl betaine, or a perfluoroalkyl amine oxide compound. Although a commercially available product of the fluorine surfactant is not particularly limited, for example, there may be mentioned S-144 or S-145 (product name, manufactured by AGC Inc.); FC-170C, FC-430, or Fluorad FC4430 (product name, manufactured by Sumitomo 3M Limited); FSO, FSO-100, FSN, FSN-100, or FS-300 (product name, manufactured by DuPont); or FT-250 or 251 (product name, manufactured by Neos Co., Ltd.). The fluorine surfactants may be used alone, or at least two types thereof may be used in combination.

Although the silicone surfactant is not particularly limited, for example, there may be mentioned a polysiloxane compound or a polyether modified organosiloxane. Although a commercially available product of the silicone surfactant is not particularly limited, for example, there may be mentioned BYK-306, BYK-307, BYK-333, BYK-341, BYK-345, BYK-346, BYK-347, BYK-348, or BYK-349 (product name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (product name, manufactured by Shin-Etsu Chemical Co., Ltd.).

The content of the surfactant with respect to the total mass of the aqueous ink composition is preferably 0.1 to 5.0 percent by mass and more preferably 0.1 to 3.0 percent by mass. Since the content of the surfactant is in the range described above, the wettability of the aqueous ink composition adhered to the recording medium tends to be further improved.

———Wax———

In order to further improve the abrasion resistance, the aqueous ink composition may contain a wax. Although the wax is not particularly limited, for example, a hydrocarbon wax or an ester wax which is a condensate of a fatty acid and a monovalent or a polyvalent alcohol may be mentioned. Although the hydrocarbon wax is not particularly limited, for example, there may be mentioned a paraffin wax or a polyolefin wax, such as a polyethylene wax or a polypropylene wax. Those waxes may be used alone, or at least two types thereof may be used in combination.

As a commercially available product of the paraffin wax, for example, AQUACER497 or AQUACER539 (product name, manufactured by BYK) may be mentioned.

As a commercially available product of the polyolefin wax, for example, there may be mentioned Chemipearl S120, S650, or S75N (product name, manufactured by Mitsui Chemicals Inc.); AQUACER501, AQUACER506, AQUACER513, AQUACER515, AQUACER526, AQUACER593, or AQUACER582 (product name, manufactured by BYK).

The boiling point of the wax is preferably 50° C. to 200° C., more preferably 70° C. to 180° C., and further preferably 90° C. to 180° C.

The wax is preferably added as wax particles contained in an aqueous emulsion in which a wax is dispersed in water. The wax particles may contain, for example, a surfactant for dispersion.

The content of the wax with respect to the total mass of the aqueous ink composition is preferably 0.1 to 5.0 percent by mass, more preferably 0.3 to 4.0 percent by mass, and further preferably 0.5 to 3.0 percent by mass. Since the content of the wax is in the range described above, the abrasion resistance of the recorded matter can be further improved.

———Other Components———

In order to preferably maintain storage stability of the aqueous ink composition and ejection stability thereof from the ink jet head, in order to improve a clogging resistance, and/or in order to prevent degradation of the aqueous ink composition, various additives, such as a solubilizing agent, a viscosity adjuster, a pH adjuster, an antioxidant, an antiseptic, a fungicide, a corrosion inhibitor, and/or a chelating agent, may be appropriately added.

———Solvent———

The aqueous ink composition preferably further contains a solvent. Although the solvent is not particularly limited, for example, an organic solvent and/or water may be mentioned.

Although the water is not particularly limited, for example, there may be mentioned purified water, such as ion-exchanged water, ultrafiltration water, reverse osmosis water, or distilled water, or water, such as ultrapure water, from which ionic impurities are removed as much as possible. In addition, when water sterilized by ultraviolet radiation or addition of hydrogen peroxide is used, generation of fungi and/or bacteria can be prevented when the aqueous ink composition is stored for a long time. As a result, the storage stability tends to be further improved.

The content of the water in the aqueous ink composition is preferably 30.0 to 90.0 percent by mass, more preferably 40.0 to 85.0 percent by mass, and further preferably 50.0 to 80.0 percent by mass.

As the organic solvent, a volatile water-soluble organic solvent is more preferable. Although the organic solvent is not particularly limited, for example, there may be mentioned an alcohol or a glycol, such as glycerin, ethylene glycol, diethylene glycol, triethylene glycol, propylene glycol, dipropylene glycol, pentamethylene glycol, trimethylene glycol, 1,3-propanediol, 1,2-butanediol, 1,2-pentanediol, 1,2-hexanediol, 1,4-butanediol, 1,5-pentanediol, 1,6-hexanediol, 2-butene-1,4-diol, 2-ethyl-1,3-hexanediol, 2-methyl-2,4-pentanediol, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-isopropyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol, tripropylene glycol dimethyl ether, methanol, ethanol, n-propyl alcohol, isopropyl alcohol, n-butanol, 2-butanol, tert-butanol, isobutanol, n-pentanol, 2-pentanol, 3-pentanol, or tert-pentanol; N,N-dimethylformamide, N,N-dimethylacetamide, 2-pyrrolidone, N-methyl-2-pyrrolidone, 2-oxazolidone, 1,3-dimethyl-2-imidazolidinone, dimethyl sulfoxide, sulfolane, 1,1,3,3-tetramethyl urea, 1,3-propylene glycol, isopropylene glycol, isobutylene glycol, mesoerythritol, or pentaerythritol. Those organic solvents may be used alone, or at least two types thereof may be used in combination. Among those organic solvents, an alcohol or a glycol is preferable, and propylene glycol or 1,2-hexanediol is more preferable.

The content of the organic solvent in the aqueous ink composition is preferably 1.0 to 50.0 percent by mass, more preferably 3.0 to 30.0 percent by mass, and further preferably 5.0 to 20.0 percent by mass. Since the content of the organic solvent is in the range described above, the generation of white haze can be more significantly suppressed, and in addition, the abrasion resistance can also be improved. In particular, since the content of the organic solvent is 20.0 percent by mass or more, the generation of white haze can be more significantly suppressed, and in addition, the abrasion resistance can also be improved.

—Recording Medium—

Although the recording medium in the ink jet recording method of this embodiment may be any one of a non-absorptive recording medium, a low-absorptive recording medium, and an absorptive recording medium, a non-absorptive recording medium or a low-absorptive recording medium is preferable. The absorptive recording medium is inferior in terms of water resistance, abrasion resistance, and the like, and when the absorptive recording medium is formed using an ink receiving layer as a surface layer, the cost may be disadvantageously increased in some cases. On the other hand, the non-absorptive recording medium and the low-absorptive recording medium are each superior in terms of water resistance, abrasion resistance, and cost as compared to those of the absorptive recording medium formed using an ink receiving layer as a surface layer.

In this embodiment, the "low-absorptive recording medium" and the "non-absorptive recording medium" each indicate a recording medium having a water absorption amount of 10 mL/m$^2$ or less for 30 milli seconds from a contact start in accordance with Bristow method. This Bristow method is a most popular method as a method for measuring a liquid absorption amount in a short period and has been employed by Japan Technical Association of the Pulp and Paper Industry (TAPPI). The details of the test method has been disclosed in Standard No. 51 "Paper and Paperboard-Liquid Absorption Test Method-Bristow Method", JAPAN TAPPI PAPER AND PULP TEST METHODS, 2000.

Although the low-absorptive recording medium is not particularly limited, for example, there may be mentioned coated paper having a coating layer to receive an oil based ink as a surface layer. In particular, paper having improved fine appearance and smoothness by applying paint to its surface may be mentioned and is categorized in coated printing paper by "Current Production Survey" of Ministry of Economy, Trade and Industry. As the paint, for example, there may be mentioned a paint formed by mixing a white pigment which is an inorganic compound, such as calcium carbonate or clay including kaolin, and an adhesive such as a starch. The application amount of the paint is preferably approximately 10 to 40 g/m$^2$. Although the coated paper is not particularly limited, for example, there may be mentioned recording paper, such as art paper, coated paper, matte paper, or cast paper.

When the recording medium contains a sulfate salt as a material forming a recording surface thereof, the generation of white haze caused by precipitation of a reaction product between the sulfate salt and the aggregating agent becomes more apparent. In this case, when the cooling step according to this embodiment is performed, the generation of white haze can also be suppressed. In this case, as the sulfate salt, for example, a sulfate monovalent metal salt, such as sodium sulfate, may be mentioned. When silica is contained in a coating layer of coated paper, since a sulfate salt, such as sodium sulfate, is contained as a by-product in silica production, the coated paper frequently contains a sulfate salt.

Although the non-absorptive recording medium is not particularly limited, for example, there may be mentioned a plastic film having no ink absorbing layer, a recording medium having a surface on which a plastic is coated, a recording medium having a surface on which a plastic film is adhered, a metal plate formed, for example, of iron, silver, copper, or aluminum, or glass.

Although the plastic described above is not particularly limited, for example, there may be mentioned a poly(vinyl chloride), a poly(ethylene terephthalate), a polycarbonate, a polystyrene, a polyurethane, a polyethylene, a polypropylene, or a polyacrylic resin.

Hereinafter, the steps of the ink jet recording method of this embodiment will be described in detail.

—Treatment Liquid Adhesion Step—

The treatment liquid adhesion step is a step of adhering the treatment liquid containing an aggregating agent to the recording medium to form a treatment liquid layer. Although an adhesion method is not particularly limited, for example, roller coating, spray coating, or ink jet coating may be used. In addition, the ink jet recording method of this embodiment may further includes a step of, during or after the treatment liquid adhesion step, drying at least a part of the treatment liquid applied to the recording medium.

The adhesion amount of the treatment liquid per unit area in a region (hereinafter, referred to as "adhesion region of the treatment liquid" in some cases) on the recording medium to which the treatment liquid is adhered is preferably 1 to 10 mg/inch$^2$ and more preferably 1 to 7 mg/inch$^2$. Hereinafter, in each embodiment, this adhesion amount is also simply called "adhesion amount of the treatment liquid" in some cases. Since the adhesion amount of the treatment liquid is in the range described above, the image quality of the recorded matter to be obtained tends to be improved.

The adhesion amount of the treatment liquid with respect to the total adhesion amount of the aqueous ink composition is preferably 1 percent by mass or more, more preferably 3 percent by mass or more, further preferably 5 percent by mass or more, and even further preferably 8 percent by mass or more. Since the adhesion amount of the treatment liquid is the lower limit or more, the image quality of the recorded matter to be obtained tends to be further improved. In addition, the adhesion amount of the treatment liquid with respect to the total adhesion amount of the aqueous ink composition is preferably 50 percent by mass or less, more preferably 30 percent by mass or less, further preferably 20 percent by mass or less, and even further preferably 15 percent by mass or less. Since the adhesion amount of the treatment liquid is the upper limit or less, the abrasion resistance of the recorded matter to be obtained tends to be further improved.

The adhesion amount of the aggregating agent contained in the treatment liquid per unit area of the adhesion region of the treatment liquid is preferably $3\times10^{-5}$ to $150\times10^{-5}$ mmol/inch$^2$, more preferably $5\times10^{-5}$ mmol/inch$^2$ or more, further preferably $10\times10^{-5}$ mmol/inch$^2$ or more, and even further preferably $20\times10^{-5}$ mmol/inch$^2$ or more. The adhesion amount described above is preferably $100\times10^{-5}$ mmol/inch$^2$ or less, more preferably $80\times10^{-5}$ mmol/inch$^2$ or less, further preferably $50\times10^{-5}$ mmol/inch$^2$ or less, and even further preferably $40\times10^{-5}$ mmol/inch$^2$ or less. Since the adhesion amount described above is in the range described above, the image quality of the recorded matter is further improved, and the generation of white haze can be more significantly suppressed.

—Ink Adhesion Step—

The ink adhesion step is a step of adhering the aqueous ink composition containing a colorant to the recording medium by ejection thereof from an ink jet head. In this step, the treatment liquid is not required to be fully dried. While the treatment liquid is not fully dried, since the aqueous ink composition is adhered, the increase in recording rate can be achieved. In addition, the recording method of this embodiment may further include a step of, before the ink adhesion step, drying at least a part of the treatment liquid adhered on the recording medium. In addition, the drying step as described above is preferably a step in which the treatment liquid is not fully dried but is partially dried. In addition, the recording method of this embodiment may also include a step of, during or after the ink adhesion step, drying at least a part of the aqueous ink composition applied to the recording medium.

The adhesion amount of the aqueous ink composition per unit area of the region on the recording medium to which the aqueous ink composition is adhered is preferably 1 to 30 mg/inch$^2$, more preferably 5 to 25 mg/inch$^2$, and further preferably 10 to 20 mg/inch$^2$. Since the adhesion amount of the aqueous ink composition is in the range described above, the image quality of the recorded matter to be obtained tends to be further improved, the generation of white haze tends to be more significantly suppressed, the abrasion resistance of the recorded matter to be obtained tends to be improved, and furthermore, the ejection stability of the aqueous ink composition tends to be improved.

The adhesion amount of the treatment liquid, the adhesion amount of the aggregating agent, and the adhesion amount of the ink composition described above imply that the image to be recorded by the recording method includes at least one region having the adhesion amounts described above. The region is a region having a predetermined area and is, for example, a region having an area of 1×1 mm in which the adhesion amounts are each uniform. In addition, in a region in the image to be recorded by the recording method in which the adhesion amount of the ink composition is highest, when the adhesion amount of the treatment liquid, the adhesion amount of the aggregating agent, and the adhesion amount of the ink composition are in the ranges described above, the above effect can be preferably more likely to be obtained.

In the aqueous ink adhesion step, by an ink jet method, the aqueous ink composition can be adhered on the recording medium by ejection thereof from a nozzle of a line head or a serial head. A line method using a line head can record an image on the recording medium such that while the head is fixed, the recording medium is transferred along a sub-scanning direction (longitudinal direction of the recording medium, transport direction), and ink droplets are ejected from a nozzle opening of the head in association with this transfer. In addition, a serial method using a serial head can record an image on the recording medium such that the head is transferred along the main scanning direction (lateral direction of the recording medium, width direction), and in association with this transfer, ink droplets are ejected from an nozzle opening of the head.

A surface temperature of the recording medium when the aqueous ink composition is adhered in the ink adhesion step is preferably 45° C. or less, more preferably 40° C. or less, and further preferably 35° C. or less. The surface temperature described above is preferably 10° C. or more, more preferably 15° C. or more, further preferably 20° C. or more, and even further preferably 25° C. or more. Since the surface temperature of the recording medium is in the range described above, smoothing of irregularities of the surface can be promoted, and the image quality of the recorded matter can be further improved. The surface temperature described above may be adjusted, for example, by the platen heater 4. The surface temperature of the recording medium when the aqueous ink composition is adhered in the ink adhesion step is the maximum temperature of a part of the recording medium which faces the ink jet head in the ink composition adhesion step.

—First Heating Step—

The first heating step is a step of heating the recording medium to which the treatment liquid and the aqueous ink composition are adhered to the first surface temperature by the first heating mechanism. By the step described above, a recorded matter excellent in image quality can be obtained. The first heating step is preferably performed simultaneously with or immediately after the above ink adhesion step and is more preferably performed simultaneously therewith. Since the recording medium is heated to the first surface temperature when the ink is adhered, the colorant is aggregated at the same time when the ink is adhered, and the color development is improved. The case in which the first heating step is simultaneously performed with the ink adhesion step indicates that the ink composition is adhered to a recording medium which is heated in advance. That is, the first surface temperature to be described later may be the surface temperature of the recording medium when the aqueous ink composition is adhered in the ink adhesion step described above.

The first surface temperature is preferably 25° C. or more and more preferably 28° C. or more. The first surface temperature is preferably 50° C. or less, more preferably 45° C. or less, further preferably 40° C. or less, and even further preferably 38° C. or less. Since the first surface temperature is set in the range described above, the image quality can be further improved, and the generation of white haze can be further suppressed. The first surface temperature is the maximum temperature of a recording side surface of the recording medium in the first heating step. The first surface temperature may be adjusted, for example, by the IR heater 3 and the platen heater 4 of the ink jet recording apparatus 1.

—Second Heating Step—

The second heating step is a step of heating the recording medium after the first heating step to the second surface temperature which is higher than the first surface temperature by the second heating mechanism provided at downstream than the first heating mechanism in the recording medium transport direction. By the step described above, a recorded matter which is excellent in image quality and which can suppress the generation of white haze can be obtained.

The second surface temperature is preferably 50° C. or more, more preferably 60° C. or more, and further preferably 70° C. or more. The second surface temperature is preferably 110° C. or less, more preferably 100° C. or less, and further preferably 90° C. or less. Since the second surface temperature is set in the range described above, the generation of white haze can be further suppressed. The second surface temperature is the maximum temperature of the recording side surface of the recording medium in the second heating step. The second surface temperature may be adjusted, for example, by the dry heater 5 of the ink jet recording apparatus 1.

The dry heater 5 is the second heating mechanism. The heating in the second heating step may be performed by a method in which heat is conducted to the recording medium from a member in contact therewith, a method in which a hot wind is applied to the recording medium, or a method in which, for example, infrared rays are radiated to the recording medium. Since the heating can be rapidly performed because of excellent heat efficiency, and a solvent component of the ink can be evaporated before the crystals are produced and grown, an IR heater or hot wind application is preferable, and an IR heater is particularly preferable.

A time after the first heating step to the start of the second heating step is preferably 10 seconds or more, more preferably 20 seconds or more, and further preferably 30 seconds or more. In addition, the time described above is preferably 60 seconds or less, more preferably 50 seconds or less, and further preferably 40 seconds or less. The "after the first heating step" indicates a timing at which a certain position of the recording medium is disengaged from the first heating mechanism. For example, in the case in which the platen heater is used, the "after the first heating step" indicates a timing at which a certain position of the recording medium is disengaged from the platen heater. The "to the start of the second heating step" indicates a timing at which the certain position of the recording medium reaches the second heating mechanism.

—Cooling Step—

The cooling step is a step of, after the first heating step and before the second heating step, cooling the recording medium by the cooling mechanism. By this cooling step, the surface temperature of the recording medium is decreased to a temperature lower than the first surface temperature. By the step described above, the generation of white haze can be suppressed.

The cooling step may cool the recording medium at least after the first heating step and before the second heating step. The recording medium is preferably cooled during the first heating step and before the second heating step. As the cooling performed during the first heating step, for example, an air blow method by the air blow mechanism may be mentioned. Since the recording medium is cooled after the first heating step and before the second heating step, after the first heating step, the first heating temperature is prevented from being maintained for a long time and/or from being slowly decreased, and since the temperature is rapidly cooled, the growth of crystals of the aggregating agent can be prevented. In addition, even in the first heating step, the recording medium is also preferably cooled. In the case described above, as the cooling mechanism, the air blow mechanism is preferably used. In this case, since the heating in the first heating step is controlled, the production and the growth of crystals of the aggregating agent are preferably more sufficiently prevented.

As described above, the cooling mechanism is preferably an air blow mechanism. Since the air blow mechanism is used, during the first heating step and before the start of the second heating step, air blow may be continuously performed.

When the cooling mechanism is the air blow mechanism, the wind velocity is preferably 0.1 m/sec or more, more preferably 0.5 m/sec or more, further preferably 1 m/sec or more, and even further preferably 2 m/sec or more. The wind velocity is preferably 10 m/sec or less, more preferably 5 m/sec or less, and further preferably 3 m/sec or less. Since the wind velocity is in the range described above, the temperature of the recording medium can be decreased, and the generation of white haze can be more significantly suppressed. The wind velocity described above is a value measured by a wind velocity meter and indicates the maximum wind velocity measured right above a recording surface of the recording medium between the first heating mechanism and the second heating mechanism at which cooling is performed by the cooling mechanism.

The temperature after the cooling step is preferably 50° C. or less, more preferably 40° C. or less, even more preferably 34° C. or less, further preferably 32° C. or less, even further preferably 30° C. or less, and even more further preferably 25° C. or less. Since the temperature described above is in the above range, the temperature can be decreased by the cooling step, the crystal growth of the aggregating agent can be prevented, and the generation of white haze can be more significantly suppressed. Although the lower limit of the temperature after the cooling step is not particularly limited, for example, the lower limit may be 10° C. or more, 20° C. or more, or 24° C. or more. In this case, the temperature after the cooling step indicates the minimum surface temperature of a part of the recording medium at which the cooling step is performed.

The temperature after the cooling step is preferably lower than the first surface temperature by 3° C. or more and more preferably by 4° C. or more. Since there is the temperature difference as described above, the recorded matter is cooled without having a time for crystal growth, and hence, the generation of white haze can be more reliably prevented. On the other hand, the temperature after the cooling step is preferably lower than the first surface temperature by 20° C. or less, more preferably by 15° C. or less, even more preferably by 10° C. or less, and further preferably by 8° C. or less. In the case described above, it is preferable since the cooling step can be minimized, and the recording can be easily controlled.

The second surface temperature is preferably higher than the temperature after the cooling step by 20° C. or more, more preferably by 30° C. or more, further preferably by 40° C. or more, more further preferably by 50° C. or more, and even more further preferably by 60° C. or more. Since there is the temperature difference as described above, the solvent on the recording medium is rapidly evaporated in the second heating step without any time for crystal growth, and hence, the generation of white haze can be more reliably prevented. Although not particularly limited, the second surface temperature may be set to be higher than the temperature after the cooling step by 100° C. or less.

The second surface temperature is preferably higher than the first surface temperature by 20° C. or more, more preferably by 30° C. or more, further preferably by 40° C. or more, more further preferably by 50° C. or more, and even more further preferably by 60° C. or more. The second surface temperature may be set to be higher than the temperature after the cooling step by 100° C. or less. In the case described above, it is preferable by the same points as described above.

EXAMPLES

Hereinafter, although the present disclosure will be described in detail with reference to examples and comparative examples, the present disclosure is not limited to the following examples.

Production Example of Resin Emulsion

A resin emulsion was prepared as described below. In a reaction vessel equipped with a dripping device, a thermometer, a water-cooled reflux condenser, and a stirring device, after 100 parts of ion-exchanged water was received, and 0.2 parts of potassium persulfate as a polymerization initiator was added while stirring was performed in a nitrogen atmosphere at 70° C., a monomer solution containing 7 parts of ion-exchanged water, 0.05 parts of sodium lauryl sulfate, 114 parts of styrene, 45 parts of n-butyl acrylate, and 0.02 parts of t-dodecyl mercaptan was dripped at 70° C. to perform a reaction, so that a dispersion of a first resin was formed. Subsequently, after 2 parts of an ammonium persulfate solution at a concentration of 10% was added and stirred, a reaction solution containing 30 parts of ion-exchanged water, 0.2 parts of potassium lauryl sulfate, 22 parts of methyl acrylate, 17 parts of ethyl acrylate, 26 parts of methyl methacrylate, 4 parts of acrylic acid, and 0.5 parts of t-dodecyl mercaptan was further added while stirring was performed at 70° C. so as to obtain a second resin by polymerization. Next, the reaction solution thus obtained was neutralized with sodium hydroxide to have a pH of 8 to 8.5 and was then filtrated using a 0.3-μm filter, so that an aqueous dispersion liquid of composite resin particles composed of the first resin and the second resin was formed. In particular, an aqueous dispersion liquid of core-shell resin particles was formed. In addition, basically, the addition amounts and the types of (meth)acrylic monomers were adjusted and changed so that a glass transition temperature Tg of 80° C. was obtained as an entire resin. A component rate of a vinyl monomer (styrene) was 51 percent by mass.

A differential scanning calorimetric measurement (DSC) in accordance with JIS K7121 was performed on the resin particles obtained as described above, and the glass transition temperature (Tg) as the entire resin was 80° C. As a differential scanning calorimeter, Model No. "DSC6220" manufactured by Seiko Denshi Kogyo Co., Ltd. was used.

In addition, the composite resin particles obtained as described above were measured using a Microtrack UPA (manufactured by Nikkiso Co., Ltd.), and as the particle diameter (nm) (volume basis) of the core-shell type polymer particles, an average particle diameter of 225 nm was obtained.

—Preparation of Aqueous Ink Composition and Treatment Liquid—

Materials were mixed to have the compositions shown in the following Tables 1 and 2 and were sufficiently stirred, so that aqueous ink compositions were obtained. In particular, the materials were uniformly mixed together, and insoluble materials were removed with a filter, so that the ink compositions and the treatment liquids were prepared. In addition, a pigment was mixed with a pigment dispersant (water-soluble styrene-acrylic resin) not shown in the table at a mixing mass ratio of the pigment to the pigment dispersant of 1:1 and was then dispersed in water to prepare a pigment dispersion liquid, and the ink was prepared using this pigment dispersion liquid.

TABLE 1

| AQUEOUS INK COMPOSITION | | | A | B | C | D |
|---|---|---|---|---|---|---|
| COMPOSITION (PERCENT BY MASS) | PIGMENT (SOLID CONTENT) | CARBON BLACK | 4.0 | 4.0 | 4.0 | 4.0 |
| | RESIN PARTICLES (SOLID CONTENT) | RESIN EMULSION | 5.0 | 2.5 | 5.0 | 5.0 |
| | ORGANIC SOLVENT 1 | 2-PYRROLIDONE | 15.0 | 15.0 | 7.5 | 20.0 |
| | ORGANIC SOLVENT 2 | 1,3-BUTANEDIOL | 10.0 | 10.0 | 5.0 | 15.0 |
| | SURFACTANT | BYK-348 | 2.0 | 2.0 | 2.0 | 2.0 |
| | WATER | | BALANCE | BALANCE | BALANCE | BALANCE |
| TOTAL | | | 100.0 | 100.0 | 100.0 | 100.0 |

Details of the components shown in Table are as described below.

Carbon black: C.I. Pigment Black 7

Resin emulsion: styrene-acrylic resin emulsion (resin emulsion obtained by the above production example)

BYK-348: silicone surfactant "BYK-348" (product name, manufactured by BYK Japan KK)

TABLE 2

| TREATMENT LIQUID | | | A | B | C | D | E | F | G |
|---|---|---|---|---|---|---|---|---|---|
| COMPOSITION (PERCENT BY MASS) | AGGREGATING AGENT | MAGNESIUM SULFATE (HEPTAHYDRATE) | 6.0 | 3.0 | 9.0 | 6.0 | 6.0 | — | — |
| | | CALCIUM PROPIONATE | — | — | — | — | — | — | 6.0 |
| | | CATIOMASTER PDT-2 | — | — | — | — | — | 4.0 | — |

TABLE 2-continued

Table 2

| TREATMENT LIQUID | | A | B | C | D | E | F | G |
|---|---|---|---|---|---|---|---|---|
| ORGANIC SOLVENT 1 | 2-PYRROLIDONE | 20.0 | 20.0 | 20.0 | 10.0 | 25.0 | 20.0 | 20.0 |
| ORGANIC SOLVENT 2 | 1,3-BUTANEDIOL | 10.0 | 10.0 | 10.0 | 5.0 | 15.0 | 10.0 | 10.0 |
| SURFACTANT | BYK-348 | 2.0 | 2.0 | 2.0 | 2.0 | 2.0 | 2.0 | 2.0 |
| | WATER | BALANCE | BALANCE | BALANCE | BALANCE | BALANCE | BALANCE | BALANCE |
| TOTAL | | 100.0 | 100.0 | 100.0 | 100.0 | 100.0 | 100.0 | 10.0 |

Details of the components shown in the table are as described below.

Aggregating agent: cationic polymer "Catiomaster PDT-2" (product name, manufactured by Yokkaichi Chemical Co., Ltd.)

BYK-348: silicone surfactant "BYK-348" (product name, manufactured by BYK Japan KK)

Ink Jet Recording Method (Examples 1 to 20, Comparative Examples 1 to 7)

As an ink jet printer, a modified printer which was formed by modifying a serial printer "SC-580650" (product name, manufactured by Seiko Epson Corporation) was prepared, and printing was performed under the following printing conditions. During ink jet recording, as a first heating mechanism, a platen heater was operated, and a recording side surface temperature (maximum temperature during the recording in the range described above) of a recording medium at a position facing an ink jet head is shown in Table 3 as the first surface temperature. As an air blow mechanism, an air blow mechanism as shown in FIG. 2 was provided. By this air blow mechanism, at an upper side of the platen heater, air blow was performed at a wind velocity shown in Table 3 from upstream to downstream in a recording medium transport direction. The wind velocity was measured by a digital wind velocity meter "EA739AR-2" (manufactured by Esco Co., Ltd.). Between the first heating mechanism and a second heating mechanism, a wind velocity measured at an upper side of a part of the recording medium which receives the air blow was regarded as the maximum wind velocity.

When the wind velocity was 1 m/sec or more, the air blow was performed so as to reach a point just in front of the second heating mechanism. A wind temperature was 24° C. In addition, in the environment during the recording, the temperature and the relative humidity were set to 24° C. and 50%, respectively. In the ink jet printer used in each of the examples and comparative examples, as the second heating mechanism, a dry heater was provided at downstream than the first heating mechanism. As the dry heater, an IR heater was used. The maximum temperature (maximum temperature in the second heating step) of the surface of the recording medium at a recording surface side was shown as the second surface temperature in the table. As the ink jet head 2 mounted on the carriage 9 shown in FIG. 1, ink jet heads were sequentially disposed on a carriage from upstream in the recording medium transport direction so that the treatment liquid and the aqueous ink composition were adhered in this order. A time from a timing at which a certain position of the recording medium was disengaged from the platen heater and to a timing at which the above certain position reached the second heating mechanism was regarded as a time from the first heating to the second heating and is shown in the table. The distance between the platen heater and the dry heater was adjusted, so that the time was controlled. The temperature after the cooling step shown in the table indicates the minimum surface temperature of a part of the recording medium between the platen heater and the second heating mechanism at which the cooling step is performed.

——Printing Conditions——

Adhesion amount: shown in the table.

Number of printing passes of each ink and treatment liquid: eight passes

Nozzle density of nozzle lines of ink jet head: 600 dpi, number of nozzles: 600

Recording medium 1: low-absorptive recording medium "NIJBGM" (product name, manufactured by Nitie Corporation, synthetic paper, containing sodium sulfate)

Recording medium 2: low-absorptive recording medium "GS Poster Paper" (product name, manufactured by Seiko Epson Corporation, containing sodium sulfate)

—Evaluation—

——White Haze——

A recording pattern having a size of 5×5 cm was recorded. After a recorded matter was left at ordinary temperature for one day, the recording pattern was observed by visual inspection, and the image quality was evaluated by the following evaluation criteria. After a surface of the recording pattern which was left for one day was wiped with a cupra-made non-woven cloth "Bemcot" (product name, manufactured by Ozu Corporation), the change in surface appearance after the wiping was confirmed.

A: No white haze is observed. When the surface is wiped with a non-woven cloth, the change cannot be confirmed.

B: No white haze is observed. When the surface is wiped with a non-woven cloth, white haze can be confirmed.

C: White haze is slightly observed. When the surface is wiped with a non-woven cloth, white haze can be confirmed.

D: White haze is apparently observed. When the surface is wiped with a non-woven cloth, white haze can be clearly confirmed.

——Image Quality——

A recording pattern having a size of 5×5 cm was recorded. The recording pattern was observed by visual inspection, and the image quality was evaluated by the following evaluation criteria.

Evaluation Criteria

A: Irregularities in the pattern and blurring of ink at the pattern edge are not observed.

B: Irregularities in the pattern are not observed, but blurring of ink at the pattern edge is slightly observed.

C: Irregularities in the pattern are apparently observed.

——Abrasion Resistance——

By using a Gakushin-type abrasion resistance tester "AB-301" (product name, manufactured by Tester Sangyo Co., Ltd.) in accordance with the test (JIS P 8136: 1994), a Canaquim No. 3 cloth was reciprocated 50 times at a load of 500 g on a recorded matter in which a recording pattern having a size of 5×5 cm was recorded as described above. The abrasion resistance was evaluated by the following evaluation criteria.

Evaluation Criteria

A: Recording pattern is not scratched and peeled, and transfer of ink is not observed.

B: Recording pattern is not apparently scratched and peeled, but transfer of ink is observed.

C: Recording pattern is apparently scratched and peeled.

——Clogging Resistance——

Under the printing conditions of the ink jet recording method described above, recording was continuously performed for 120 minutes. After the recording, 600 nozzles of the ink jet head were each checked whether the ejection of ink was performed or not.

Evaluation Criteria

A: Ejection is performed by each nozzle.

B: Ejection is not performed by 1% or less of all nozzles.

C: Ejection is not performed by more than 1% to 3% of all nozzles.

D: Ejection is not performed by more than 3% of all nozzles.

TABLE 3

Table 3 (1/4)

| | | EXAMPLE | | | | | | |
|---|---|---|---|---|---|---|---|---|
| | | 1 | 2 | 3 | 4 | 5 | 6 | 7 |
| FIRST SURFACE TEMPERATURE (° C.) | | 28 | 28 | 28 | 28 | 28 | 28 | 35 |
| WIND VELOCITY IN COOLING STEP (m/sec) | | 1 | 1 | 1 | 1 | 1 | 1 | 1 |
| TEMPERATURE AFTER COOLING STEP (° C.) | | 24 | 24 | 24 | 24 | 24 | 24 | 30 |
| SECOND SURFACE TEMPERATURE (° C.) | | 90 | 90 | 90 | 90 | 90 | 60 | 90 |
| AQUEOUS INK COMPOSITION | | A | A | A | A | A | A | A |
| ADHESION AMOUNT OF AQUEOUS INK COMPOSITION (mg/inch$^2$) | | 15 | 15 | 15 | 15 | 15 | 15 | 15 |
| TREATMENT LIQUID | | A | A | A | C | B | A | A |
| ADHESION AMOUNT OF TREATMENT LIQUID (TO ADHESION AMOUNT OF AQUEOUS INK COMPOSITION (PERCENT BY MASS)) | | 10 | 20 | 5 | 10 | 10 | 10 | 10 |
| TIME FROM FIRST HEATING TO SECOND HEATING (SEC) | | 35 | 35 | 35 | 35 | 35 | 35 | 35 |
| RECORDING MEDIUM 1 | WHITE HAZE | A | A | A | B | A | B | C |
| | IMAGE QUALITY | A | A | B | A | B | A | A |
| | ABRASION RESISTANCE | A | B | A | B | A | B | A |
| | EJECTION STABILITY | A | B | A | A | A | A | A |
| RECORDING MEDIUM 2 | WHITE HAZE | A | A | A | B | A | B | C |
| | IMAGE QUALITY | A | A | B | A | B | A | A |
| | ABRASION RESISTANCE | A | B | A | B | A | B | A |

TABLE 3

Table 3 (2/4)

| | | EXAMPLE | | | | | | |
|---|---|---|---|---|---|---|---|---|
| | | 8 | 9 | 10 | 11 | 12 | 13 | 14 |
| FIRST SURFACE TEMPERATURE (° C.) | | 35 | 38 | 38 | 28 | 28 | 35 | 38 |
| WIND VELOCITY IN COOLING STEP (m/sec) | | 2 | 1 | 2 | 1 | 1 | 1 | 3 |
| TEMPERATURE AFTER COOLING STEP (° C.) | | 24 | 32 | 26 | 24 | 24 | 30 | 24 |
| SECOND SURFACE TEMPERATURE (° C.) | | 90 | 90 | 90 | 90 | 90 | 90 | 90 |
| AQUEOUS INK COMPOSITION | | A | A | A | A | A | A | A |
| ADHESION AMOUNT OF AQUEOUS INK COMPOSITION (mg/inch$^2$) | | 15 | 15 | 15 | 15 | 15 | 15 | 15 |
| TREATMENT LIQUID | | A | A | A | F | D | E | A |
| ADHESION AMOUNT OF TREATMENT LIQUID (TO ADHESION AMOUNT OF AQUEOUS INK COMPOSITION (PERCENT BY MASS)) | | 10 | 10 | 10 | 10 | 10 | 10 | 10 |
| TIME FROM FIRST HEATING TO SECOND HEATING (SEC) | | 35 | 35 | 35 | 35 | 35 | 35 | 35 |
| RECORDING MEDIUM 1 | WHITE HAZE | A | C | B | A | B | B | A |
| | IMAGE QUALITY | A | A | A | A | A | A | A |
| | ABRASION RESISTANCE | A | A | A | A | A | B | A |
| | EJECTION STABILITY | B | B | B | C | A | A | C |

TABLE 3-continued

Table 3 (2/4)

|  |  | EXAMPLE | | | | | | |
|---|---|---|---|---|---|---|---|---|
|  |  | 8 | 9 | 10 | 11 | 12 | 13 | 14 |
| RECORDING MEDIUM 2 | WHITE HAZE | A | C | B | A | B | B | A |
|  | IMAGE QUALITY | A | A | A | A | A | A | A |
|  | ABRASION RESISTANCE | A | A | A | A | A | B | A |

TABLE 3

Table 3 (3/4)

|  |  | EXAMPLE | | | | | |
|---|---|---|---|---|---|---|---|
|  |  | 15 | 16 | 17 | 18 | 19 | 20 |
| FIRST SURFACE TEMPERATURE (° C.) | | 28 | 28 | 28 | 38 | 28 | 28 |
| WIND VELOCITY IN COOLING STEP (m/sec) | | 1 | 1 | 1 | 2 | 1 | 1 |
| TEMPERATURE AFTER COOLING STEP (° C.) | | 24 | 24 | 24 | 26 | 24 | 24 |
| SECOND SURFACE TEMPERATURE (° C.) | | 90 | 90 | 90 | 90 | 90 | 90 |
| AQUEOUS INK COMPOSITION | | A | B | C | D | A | A |
| ADHESION AMOUNT OF AQUEOUS INK COMPOSITION (mg/inch$^2$) | | 23 | 15 | 15 | 15 | 15 | 15 |
| TREATMENT LIQUID | | A | A | A | A | A | G |
| ADHESION AMOUNT OF TREATMENT LIQUID (TO ADHESION AMOUNT OF AQUEOUS INK COMPOSITION (PERCENT BY MASS)) | | 10 | 10 | 10 | 10 | 10 | 5 |
| TIME FROM FIRST HEATING TO SECOND HEATING (SEC) | | 35 | 35 | 35 | 35 | 55 | 35 |
| RECORDING MEDIUM 1 | WHITE HAZE | C | B | B | A | B | B |
|  | IMAGE QUALITY | B | A | A | A | A | A |
|  | ABRASION RESISTANCE | B | B | B | B | A | A |
|  | EJECTION STABILITY | B | A | B | B | A | A |
| RECORDING MEDIUM 2 | WHITE HAZE | C | B | B | A | B | B |
|  | IMAGE QUALITY | B | A | A | A | A | A |
|  | ABRASION RESISTANCE | B | B | B | B | A | A |

TABLE 3

Table 3 (4/4)

|  |  | COMPARATIVE EXAMPLES | | | | | | |
|---|---|---|---|---|---|---|---|---|
|  |  | 1 | 2 | 3 | 4 | 5 | 6 | 7 |
| FIRST SURFACE TEMPERATURE (° C.) | | 28 | 35 | 38 | 28 | 28 | 24 | 24 |
| WIND VELOCITY IN COOLING STEP (m/sec) | | — | — | — | 1 | — | 1 | — |
| TEMPERATURE AFTER COOLING STEP (° C.) | | 26 | 32 | 34 | 24 | 26 | 24 | 24 |
| SECOND SURFACE TEMPERATURE (° C.) | | 90 | 90 | 90 | 90 | 90 | 90 | 90 |
| AQUEOUS INK COMPOSITION | | A | A | A | A | A | A | A |
| ADHESION AMOUNT OF AQUEOUS INK COMPOSITION (mg/inch$^2$) | | 15 | 15 | 15 | 15 | 15 | 15 | 15 |
| TREATMENT LIQUID | | A | A | A | — | — | A | A |
| ADHESION AMOUNT OF TREATMENT LIQUID (TO ADHESION AMOUNT OF AQUEOUS INK COMPOSITION (PERCENT BY MASS)) | | 10 | 10 | 10 | 0 | 0 | 10 | 10 |
| TIME FROM FIRST HEATING TO SECOND HEATING (SEC) | | 35 | 35 | 35 | 35 | 35 | 35 | 35 |
| RECORDING MEDIUM 1 | WHITE HAZE | D | D | D | A | A | B | B |
|  | IMAGE QUALITY | A | A | A | C | C | C | C |
|  | ABRASION RESISTANCE | A | A | B | A | A | A | A |
|  | EJECTION STABILITY | A | A | C | A | A | A | A |
| RECORDING MEDIUM 2 | WHITE HAZE | D | D | D | A | A | B | B |
|  | IMAGE QUALITY | A | A | A | C | C | C | C |
|  | ABRASION RESISTANCE | A | A | B | A | A | A | A |

By comparison between the examples and the comparative examples, it is found that by the ink jet recording method of this embodiment, while an excellent image quality is obtained using the treatment liquid containing an aggregating agent, the generation of white haze can be suppressed.

From the comparison between Example 1 and Comparative Example 1, the comparison between Example 7 and Comparative Example 2, and the comparison between Example 9 and Comparative Example 3, it is found that since the ink jet recording method of this embodiment includes the cooling step, the generation of white haze can be suppressed.

From the comparison between Example 1 and Comparative Example 4, it is found that since the treatment liquid is used, an excellent image quality can be obtained. Furthermore, from the results of Comparative Examples 4 and 5, it is understood that when the treatment liquid is not used, the problem of the generation of white haze is not observed in the recorded matter obtained by the ink jet recording method, and hence, the problem of the white haze is a problem generated by the use of the treatment liquid.

From the results of Examples 1 to 3, it is found that in a wide range of the adhesion amount of the treatment liquid, the effect of suppressing a white haze can be obtained, and furthermore, it is also found that since the adhesion amount of the treatment liquid is in a predetermined range, an excellent image quality can be obtained, and in addition, the abrasion resistance of the recorded matter can be improved.

From the results of Examples 1, 4, and 5, it is found that in a wide range of the content of the aggregating agent contained in the treatment liquid, the effect of suppressing a white haze can be obtained. It is also found that since the content of the aggregating agent contained in the treatment liquid is in a predetermined range, an excellent image quality can be obtained, and in addition, the abrasion resistance of the recorded matter can be improved.

From the results of Examples 1 and 6, it is found that in a wide range of the second surface temperature, the effect of suppressing a white haze can be obtained. It is also found that since the second surface temperature is in a predetermined range, the effect of suppressing a white haze can be improved.

From the results of Examples 1, 7, and 9, it is found that in a wide range of the first surface temperature, an excellent image quality can be obtained, and furthermore, the effect of suppressing a white haze can be obtained. In addition, from the results described above, it is found that as the first surface temperature is decreased, the generation of white haze is more significantly suppressed. Furthermore, from the results of Examples 8 and 10, it is found that even if the first surface temperature is high, when a cooling effect is enhanced by increasing the wind velocity in the cooling step, the generation of white haze can be suppressed. In addition, from the result of Example 14, it is found that at a high wind velocity, a recorded matter which is excellent in image quality and which suppresses the generation of white haze can be obtained.

From the results of Examples 1, 12, and 13, it is found that in a wide range of the content of the organic solvent contained in the treatment liquid, the image quality of the recorded matter is excellent, and furthermore, the generation of white haze can be suppressed. It is also found that since the content of the organic solvent contained in the treatment liquid is in a predetermined range, the generation of white haze can be significantly suppressed.

From the results of Examples 1 and 15, it is found that in a wide range of the adhesion amount of the aqueous ink composition, the image quality of the recorded matter is excellent, and furthermore, the generation of white haze can be suppressed.

From the results of Examples 1 and 16, it is found that in a wide range of the content of the resin particles in the aqueous ink composition, the image quality of the recorded matter is excellent, and furthermore, the generation of white haze can be suppressed. From the results of Examples 1, 17, and 18, it is found that in a wide range of the content of the organic solvent in the aqueous ink composition, the image quality of the recorded matter is excellent, and furthermore, the generation of white haze can be suppressed.

From the results of Examples 1 and 19, it is found that when the time after the first heating step to the start of the second heating step is in a predetermined range, the generation of white haze can be suppressed.

From the results of Examples 1, 11, and 20, it is found that in a wide range of various types of aggregating agents, the image quality of the recorded matter is excellent, and furthermore, the generation of white haze can be suppressed.

According to Comparative Examples 6 and 7 in which no first heating step is performed, it is found that although the generation of white haze is not so much serious, the image quality is inferior.

In addition, although not described in the table, it is found that in Example 6, when the second surface temperature is further decreased to 50° C., and evaluation is performed as described above, the generation of white haze tends to be increased as compared to that in Example 6. It is found that since the second heating step is performed at a higher temperature, before crystals are produced and grown in the second heating step, the solvent component of the ink is rapidly evaporated, so that the white haze can be preferably prevented.

In addition, although not described in the table, it is found that in Example 7, when an OPP film (Pyrene film, manufactured by Toyobo Co., Ltd.) is used as the recording medium, and evaluation is performed as described above, the generation of white haze tends to be suppressed as compared to that in Example 7. This recording medium is a film containing no sodium sulfate as a material forming the recording surface. From the result thus obtained, it is found that when the recording medium contains a sulfate salt as a material forming a recording surface, this embodiment is particularly useful in terms of the suppression of white haze.

What is claimed is:

1. An ink jet recording method comprising:
   a treatment liquid adhesion step of adhering a treatment liquid containing an aggregating agent to a recording medium;
   an ink adhesion step of adhering an aqueous ink composition containing a colorant to the recording medium by ejection thereof from an ink jet head;
   a first heating step of heating the recording medium to which the treatment liquid and the aqueous ink composition are adhered to a first surface temperature by a first heating mechanism;
   a second heating step of heating the recording medium after the first heating step to a second surface temperature which is higher than the first surface temperature by a second heating mechanism provided downstream from the first heating mechanism in a recording medium transport direction; and a cooling step of, after the first heating step and before the second heating step, cooling the recording medium by a cooling mechanism, wherein by the cooling step, a surface temperature of the recording medium is decreased to a temperature lower than the first surface temperature.

2. The ink jet recording method according to claim 1, wherein the cooling mechanism includes an air blow mechanism.

3. The ink jet recording method according to claim 2, wherein the air blow mechanism supplies a wind at a wind velocity of 1 m/sec or more.

4. The ink jet recording method according to claim 1, wherein the first surface temperature is 28° C. to 45° C., and by the cooling step, the surface temperature of the recording medium is decreased to 20° C. to 34° C.

5. The ink jet recording method according to claim 1, wherein the second surface temperature is 60° C. or more.

6. The ink jet recording method according to claim 1, wherein a time after the first heating step to a start of the second heating step is 20 seconds or more.

7. The ink jet recording method according to claim 1, wherein the recording medium contains a sulfate salt as a material forming a recording surface.

8. The ink jet recording method according to claim 1, wherein a temperature after the cooling step is lower than the first surface temperature by 3° C. or more.

9. The ink jet recording method according to claim 1, wherein a content of the aggregating agent in the treatment liquid is 2.0 to 10.0 percent by mass.

10. The ink jet recording method according to claim 1, wherein the aggregating agent contains a polyvalent metal salt, an organic acid, or a cationic polymer.

11. The ink jet recording method according to claim 1, wherein the treatment liquid is an aqueous composition and contains 20.0 percent by mass or more of an organic solvent.

12. The ink jet recording method according to claim 1, wherein the aqueous ink composition contains 20.0 percent by mass or more of an organic solvent.

13. An ink jet recording apparatus comprising:

a transport mechanism which transports a recording medium;

a treatment liquid adhesion portion which adheres a treatment liquid containing an aggregating agent to the recording medium;

an ink jet head which adheres an aqueous ink composition containing a colorant to the recording medium by ejection thereof;

a first heating mechanism which heats the recording medium to which the treatment liquid and the aqueous ink composition are adhered to a first surface temperature;

a second heating mechanism which heats the recording medium heated by the first heating mechanism to a second surface temperature higher than the first surface temperature and which is provided downstream from the first heating mechanism in a recording medium transport direction; and a cooling mechanism which cools the recording medium downstream from the first heating mechanism and upstream from the second heating mechanism in the recording medium transport direction, wherein the cooling mechanism decreases a surface temperature of the recording medium to a temperature lower than the first surface temperature.

* * * * *